United States Patent [19]

Hong

[11] Patent Number: 5,764,553

[45] Date of Patent: Jun. 9, 1998

[54] GENERALIZED DATA PROCESSING PATH FOR PERFORMING TRANSFORMATION AND QUANTIZATION FUNCTIONS FOR VIDEO ENCODER SYSTEMS

[75] Inventor: John Suk-Hyun Hong, San Jose, Calif.

[73] Assignee: LSI Logic Corporation, Milpitas, Calif.

[21] Appl. No.: 607,420

[22] Filed: Feb. 28, 1996

[51] Int. Cl.[6] .................. G06F 17/14; G06K 9/36
[52] U.S. Cl. .................. 364/725.01; 364/725.03; 364/726.07; 382/248; 382/250; 348/407
[58] Field of Search ................ 364/725, 725.01, 364/725.03, 726.07; 348/405, 407; 382/250, 248

[56] References Cited

U.S. PATENT DOCUMENTS

| | | | |
|---|---|---|---|
| 4,604,721 | 8/1986 | Gray | 364/726 |
| 4,791,598 | 12/1988 | Liou et al. | 364/725 |
| 4,999,705 | 3/1991 | Puri | 348/412 |
| 5,053,985 | 10/1991 | Friedlander et al. | 364/725 |
| 5,058,594 | 10/1991 | Lazenby | 128/661.08 |
| 5,361,220 | 11/1994 | Asano | 364/725 |
| 5,528,528 | 6/1996 | Bui | 364/725 |
| 5,604,502 | 2/1997 | Haskell et al. | 341/200 |
| 5,604,540 | 2/1997 | Howe | 348/405 |

*Primary Examiner*—Reba I. Elmore
*Assistant Examiner*—Robert J. Dolan
*Attorney, Agent, or Firm*—Conley, Rose & Tayon; B. Noel Kivlin

[57] ABSTRACT

A generalized data processing path including memory, select logic, adders, subtractors, multipliers, and accumulators (MACs) is organized to perform discrete cosine transforms (DCT), quantization, inverse DCT and inverse quantization operations desired for a video motion compensation system. The select logic selects or bypasses particular adders and subtractors on the front and rear end of the data path depending upon whether the particular operation requires a butterfly operation. A plurality of adders, subtractors and MACs enable data values to be calculated in parallel for efficiency. Control logic is provided to control the memory, select logic and MACs to control data flow and the particular operation being performed. The control logic preferably includes a microcontroller, a microprocessor or associated coprocessor, etc., or a combination of these various types of controllers and processors.

24 Claims, 8 Drawing Sheets

| | 1 | 2 | 3 | 4 | 5 | 6 | 7 | 8 |
|---|---|---|---|---|---|---|---|---|
| | C00 (X00 + X70) | C10 (X00 - X70) | C20 (X00 + X70) | C30 (X00 - X70) | | | | |
| | C01 (X10 + X60) | C11 (X10 - X60) | C21 (X10 + X60) | C31 (X10 - X60) | | | | |
| | C02 (X20 + X50) | C12 (X20 - X50) | C22 (X20 + X50) | C32 (X20 - X50) | | | | |
| | C03 (X30 + X40) | C13 (X30 - X40) | C23 (X30 + X40) | C33 (X30 - X40) | | | | |
| | P00 | P10 | P20 | P30 | P40 | P50 | P60 | P70 |
| | C00 (X01 + X71) | C10 (X01 - X71) | | | | | | |
| | C01 (X11 + X61) | C11 (X11 - X61) | | | | | | |
| | C02 (X21 + X51) | C12 (X21 - X51) | | | | | | |
| | C03 (X31 + X41) | C13 (X31 - X41) | | | | | | |
| | P01 | P11 | P21 | P31 | | | | |
| | P02 | P12 | P22 | P32 | | | | |
| | P03 | P13 | P23 | P33 | | | | |
| | P04 | P14 | | | | | | |
| | P05 | P15 | | | | | | |
| | P06 | P16 | | | | | | |
| | P07 | P17 | | | | | | |

GENERALIZED DATA PROCESSING PATH FOR PERFORMING TRANSFORMATION AND QUANTIZATION FUNCTIONS FOR VIDEO ENCODER SYSTEMS

FIELD OF THE INVENTION

The present invention relates to video data processing, and more particularly to a data processing path for performing transformation and quantization operations for interfield data reduction in a motion compensation video system.

DESCRIPTION OF THE RELATED ART

Several committees and corresponding standards have been established for encoding video information according to one or more criteria or system requirements. The Moving Pictures Expert Group (MPEG) is a group which meets under the International Standards Organization (ISO) for establishing compression of digital data, including audio and video information. The official name of this group is ISO/IEC JTC1 SC29 WG11, where IEC is the International Electro-technical Commission, JTC1 is the Joint Technical Committee 1, SC29 is Sub-committee 29 and WG11 is Work Group 11 for moving pictures with audio.

Presently the two predominant standards promulgated by MPEG are MPEG-1 and MPEG-2. The MPEG-1 standard generally concerns interfield data reduction using block-based motion compensated prediction (MCP), which is a general method falling into the temporal differential pulse code modulation (DPCM) category. MPEG-2 is similar to MPEG-1, but includes extensions to cover a wider range of applications. More particularly, MPEG-2 concerns high-quality coding of possibly interlaced video, including high definition television (HDTV). A wide range of applications, bit rates, resolutions, signal qualities and services are addressed, including all forms of digital storage media, TV broadcasting and communications. The MPEG system integrates several compression techniques, including motion-compensated predictive coding, discrete cosine transform (DCT), adaptive quantization and the use of variable-length codes (VLCs).

The International Telegraph and Telephone Consultative Committee (CCITT) study group proposed the CCITT recommendation H.261 (H.261), which is intended for applications for videophone and videoconferencing. This particular video coding algorithm enables operation in real time with minimum delay. General Instruments developed DigiCipher I and II video formats, where the DigiCipher II (DC2) format supports the full MPEG-2 video main profile syntax.

In general, video information is retrieved and filtered or preprocessed and encoded prior to storage and/or transmission. Video information is retrieved using a digital video camera or the like, which samples and converts the information to digital format. The data is typically in the form of 8-bit picture elements or "pixels", or simply "pels." Each pixel is preferably scaled to an 8-bit value for red, green and/or blue (RGB) components. The pixel values are then processed by a color matrix circuit or the like, which generates luminance (Y) values, which are weighted sums of the respective RGB components. The Y luminance values are typically used in combination with color difference signals or chrominance values R-Y and B-Y to represent the picture. Various color schemes are known and derived from the Y, B-Y and R-Y luminance and color difference values, including $YP_bP_r$, $YC_bC_r$, photo YCC and YUV, each of which are scaled versions of the Y, B-Y, R-Y values for placing the extreme of the color difference channels at more convenient values.

The video values may further be processed by a video acquisition unit to extract the active portion of the pictures. The video data stored in the memory is often preprocessed prior to encoding according to MPEG-1, MPEG-2, H.261, DC2 or any other encoding scheme. Such preprocessing may include filtering functions, such as noise reduction, hierarchical decimation, chroma conversion, interlacing functions, etc., where the data is retrieved, processed and then stored back into the memory.

Video data is typically organized into a plurality of blocks, each of which comprises 8×8 pixels incorporating luminance and chrominance values. A macroblock (MB) is the basic coding unit in the MPEG algorithms. A macroblock includes four blocks of luminance values and between two to eight blocks of chrominance values, depending upon which particular format is used. Common color space sampling schemes include 4:4:4 for maximum quality but relatively low compression, 4:2:2 for MPEG-2, 4:2:0 for MPEG-1, etc. A plurality of such macroblocks form a slice, or a horizontal strip within a frame, where the slice is the basic processing unit in an MPEG coding scheme. A plurality of such slices comprise a picture or frame, which is the basic unit of display. A frame includes two fields if the video is interlaced, but may simply comprise a single frame for non-interlaced or progressive video.

Digital video information requires a relatively high data rate, so that it is often desirable or even necessary to compress the information for purposes of storage and/or transmission. Higher compression may be achieved if the redundancy between successive images is considered, where only the difference between successive images is sent or stored. Since movement reduces the similarity between successive frames or images, motion compensation techniques are used to reduce the image difference by shifting the pixel data describing a moving object in a previous image to the proper position in the next image. In general, a motion estimator compares an incoming frame with the previous frame to measure motion in the form of motion vectors, which are provided to a motion compensation unit. The motion compensation unit shifts objects to estimated positions in the new frame, resulting in a predicted frame, which is then subtracted from the input frame to obtain a frame difference or prediction error. This process separates interframe redundancy and the prediction error, otherwise referred to as entropy. The frame difference is processed to remove spatial redundancy using a combination of discrete cosine transformation (DCT), weighting and adaptive quantization.

The luminance and chrominance frame difference blocks are converted to DCT format resulting in corresponding 8×8 blocks of DCT coefficients. Transformation to DCT format does not in and of itself compress the data, but is the first step for enabling compression of video data. The DCT format simply expresses the data in a form which makes subsequent processing easier. Data reduction is performed for each individual field for interlaced video or for each frame in progressive scan standards. For each DCT block, the top left coefficient typically comprises the direct current (DC) component of the block, and the remaining values are alternating current (AC) components for higher frequencies. Once the data is in DCT format, it is then quantized into discrete steps. Also, coefficients below a predetermined threshold may be ignored during quantization.

Psycho-visual coding may then be performed on coefficients to take advantage of the decreasing sensitivity to noise of the human eye. Each coefficient is multiplied by a different weighting constant as a function of its frequency. Such psycho-visual coding has the effect of reducing the magnitude of each coefficient, so that fewer bits are needed to represent those coefficients. Thus, the coefficients are individually re-quantized with step sizes which increase with frequency. A larger step size increases the quantizing noise at frequencies where it is not visible.

A separate decoder is usually necessary in a motion compensation system to derive the frame difference by performing inverse DCT (IDCT), weighting and inverse quantization functions. Such a system required at least two or more separate data processing paths for completing a motion compensation loop, each path including a plurality of adders, subtractors and multiplier and accumulation units (MACs). This results in a relatively complex and expensive system. It is desired to provide a more efficient means for processing data for a video encoder system.

SUMMARY OF THE INVENTION

A generalized data path according to the present invention is a single data path including memory, select logic, adders, subtractors and MACs organized to perform DCT, quantization, IDCT, inverse quantization, MPEG-1 mismatch, MPEG-2 mismatch, and saturation operations desired for a video motion compensation system. Control logic is also included for controlling the various logic units depending upon the particular function being performed, where such control logic could be a microcontroller, a microprocessor or associated coprocessor, etc., or a combination of these various types of controllers and processors.

More particularly, a generalized data path according to the present invention includes a memory for storing data values, an adder and subtractor for performing preliminary butterfly calculations, first select logic for selecting data values between said memory and said adder and subtractor, a plurality of multiplier and accumulator units (MACs) for performing arithmetic and accumulation functions on data values selected by said first select logic, a plurality of adders and subtractors for performing butterfly calculations on data values from said plurality of MACs, second select logic for providing data values to said memory and said plurality of adders and subtractors, and control logic for controlling data flow and for determining the type of operation performed.

The memory preferably includes a plurality of programmable or dynamic memory devices for implementing a reconstructed block memory, a working memory for storing input and intermediate blocks of data values, a variable length encoder memory, a motion compensated block memory, a differentially coded block memory, and memory for storing quantization and inverse quantization matrix and scale multiplicand values. Another memory stores DCT and IDCT multiplicand constants, which may be a read-only memory (ROM) since these values are fixed.

The first select logic primarily selects between the adder and subtractor used for butterfly calculations for DCT operations and data directly from the memory, thereby bypassing the adder and subtractor, for remaining operations. Each of the plurality of MACS preferably includes a binary multiplier, a shifter, an adder/subtractor, feedback select logic and an accumulation register for performing desired calculations for all of the operations of the encoder system. In the preferred embodiment, the second select logic and the associated plurality of adders and subtractors for performing butterfly operation for IDCT are distributed among and incorporated within the plurality of MACs.

The generalized data path preferably includes the necessary bus structure for providing a plurality of data values to the MACs and the adders and subtractors in parallel. In the preferred embodiment, the MAC is an 8-slice MAC for operating on eight data values at a time. Furthermore, several operations, including DCT and IDCT, are performed by two separate dimensional passes through the processing path to complete the operation. The control logic also controls data flow for performing automatic transposition of data matrices to simplify calculations and improve efficiency. The control logic preferably includes a microcontroller for controlling the select logic, the memories and the MACs for controlling data flow and the particular operation being performed.

It will be appreciated that a generalized data processing path according to the present invention performs quantization and inverse quantization operations as well as the DCT and IDCT operations for a video encoder system. Memory devices are utilized more efficiently and duplicate devices, such as multiplier and accumulator units are combined into a single path, thereby resulting in a more efficient and streamlined data path.

BRIEF DESCRIPTION OF THE DRAWINGS

A better understanding of the present invention can be obtained when the following detailed description of the preferred embodiment is considered in conjunction with the following drawings, in which:

FIGS. 6A and 6B are diagrams illustrating the calculations performed for a DCT operation;

FIGS. 7A and 7B are diagrams illustrating the calculations performed for an inverse DCT (IDCT) operation;

DETAILED DESCRIPTION OF THE PREFERRED EMBODIMENT

Figure 1:
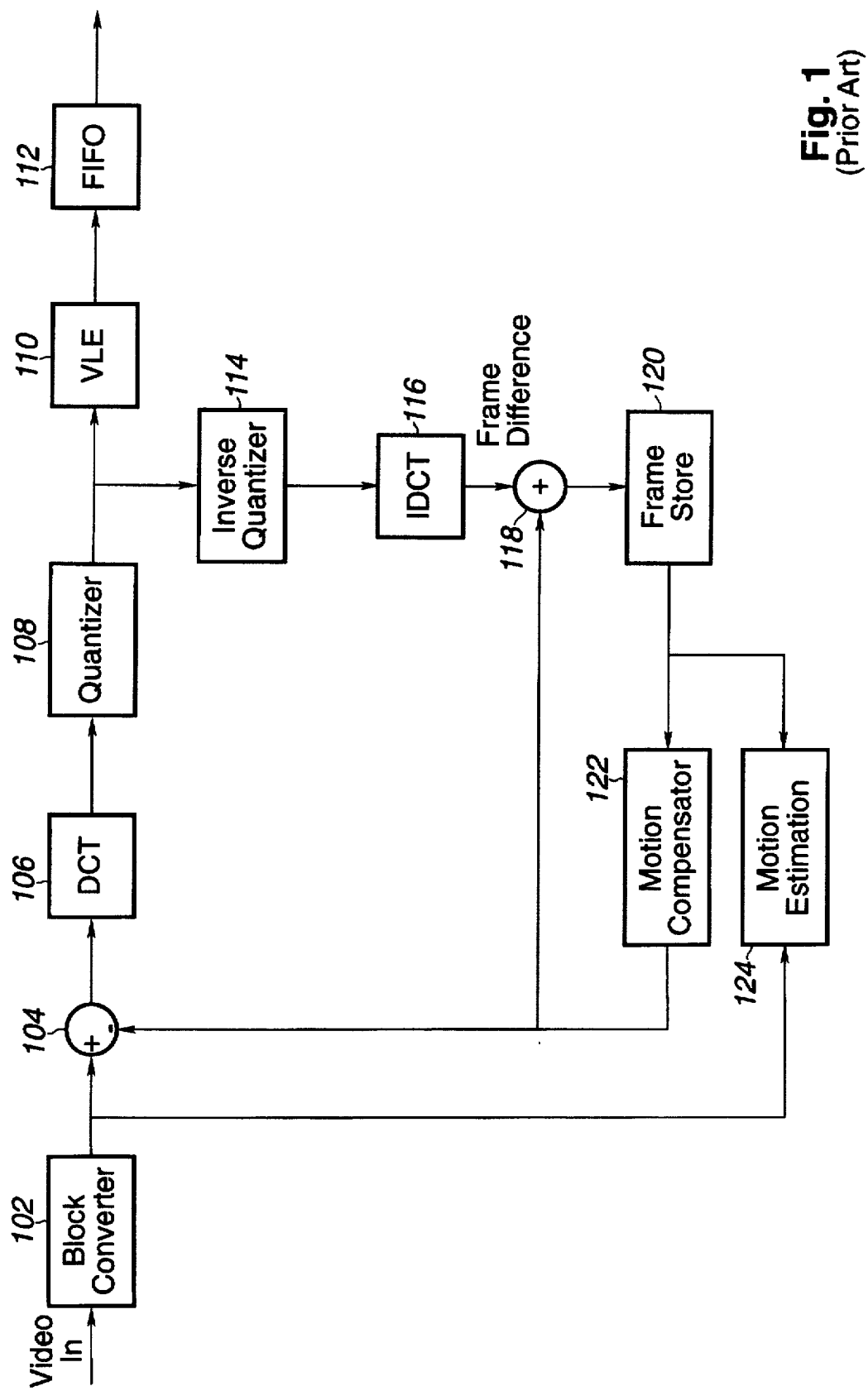
FIG. 1 is a block diagram of an exemplary MPEG video encoding system according to prior art.

Referring now to FIG. 1, a block diagram is shown of an exemplary MPEG video encoder system 100. A block converter 102 converts input luminance and chrominance video signals to block format, where each block preferably comprises an 8×8 matrix of 64 pixel values. The block format is preferably implemented as a plurality of macroblocks grouped into particular spacing formats depending upon the particular type of encoding system, such as the standard 4:4:4, 4:2:2, 4:2:0 etc. spacing formats, for example. The block converter 102 provides sequential pixel values to a subtractor 104 and to motion estimation logic 124, described further below. For an interfield data mode, the subtractor 104 subtracts each block of a macroblock provided by motion compensation logic 122, described further below, from a corresponding block provided from the block converter 102. For another mode referred to as intrafield data mode, however, the blocks from the block converter 102 pass through the subtractor 104 unmodified.

The subtractor 104 provides output blocks of motion-predicted, differentially encoded macroblocks (intermode) or unmodified output blocks (intramode) to a DCT converter 106, which converts each of the blocks to DCT format resulting in corresponding 8×8 blocks of DCT coefficients. Transformation to DCT format does not in and of itself compress the data, but is the first step for enabling compression of video data.

The DCT format simply expresses the data in a form which makes subsequent processing easier. For each DCT block, the first or top left coefficient typically comprises the direct current (DC) component of the block, and the remaining values are alternating current (AC) components for increasing vertical and horizontal frequencies.

The DCT coefficients from the DCT converter 106 are provided to a quantizer 108, which translates each coefficient value into a binary value having an assigned number of bits. A larger number of bits is typically used for the lower-order coefficients than for the higher-order coefficients since the human eye is less sensitive to image components at higher spatial frequencies than to components at lower spatial frequencies.

The data values from the quantizer 108 are provided to a variable length encoder (VLE) 110 for encoding the data for purposes of storage and/or transmission. The VLE 110 scans and converts the blocks of data to variable length codes (VLCs) according to the principles of entropy coding, where shorter codes are allocated to the more probable values to achieve coding gain and thus compression of the data. One such VLC coding scheme is referred to as the Huffman coding, although other coding schemes are contemplated. The VLCs are provided from the VLE 110 to a first-in first-out (FIFO) 112.

For the interfield mode, the data values from the quantizer 108 are provided to an inverse quantizer 114 for reversing the operation performed by the quantizer 108 to produce approximate DCT coefficients representing each block of the encoded image. Since quantization is usually a lossy process, the output of the inverse quantizer 114 introduces noise and errors. Mismatch control may be applied to minimize the noise and errors, where the particular functions performed depend upon the particular type of encoder system is being implemented, such as MPEG-1, MPEG-2, H.261, DC2, etc.

The output data of the inverse quantizer 114 is provided to an inverse DCT (IDCT) converter 116 for reversing the operation performed by the DCT converter 106. The frame difference blocks at the output of the IDCT converter 116 are provided to one input of a two-input adder 118, which also receives the output data blocks from the motion compensation logic 122. The output pixel values from the adder 118 are provided to a frame store memory 120, where the stored data may be provided to a video buffer (not shown) and displayed on a display device (not shown), such as a monitor.

The values in the frame store memory 120 are provided to the input of the motion compensation logic 122 and to another input of the motion estimation logic 124. In general, the motion estimation logic 124 compares the incoming frame from the block converter 102 with the reconstructed previous frame stored in the frame store memory 120 to measure motion in the form of motion vectors, where the motion vectors are provided to the motion compensation logic 122. The motion compensation logic 122 shifts objects to estimated positions in the new frame, resulting in a predicted frame, which is then subtracted from the input frame to obtain a frame difference or prediction error. This process separates interframe redundancy and the prediction error, otherwise referred to as entropy. In the interfield mode, the frame difference is processed by the DCT converter 106 and the quantizer 108 to remove spatial redundancy.

Figure 2:
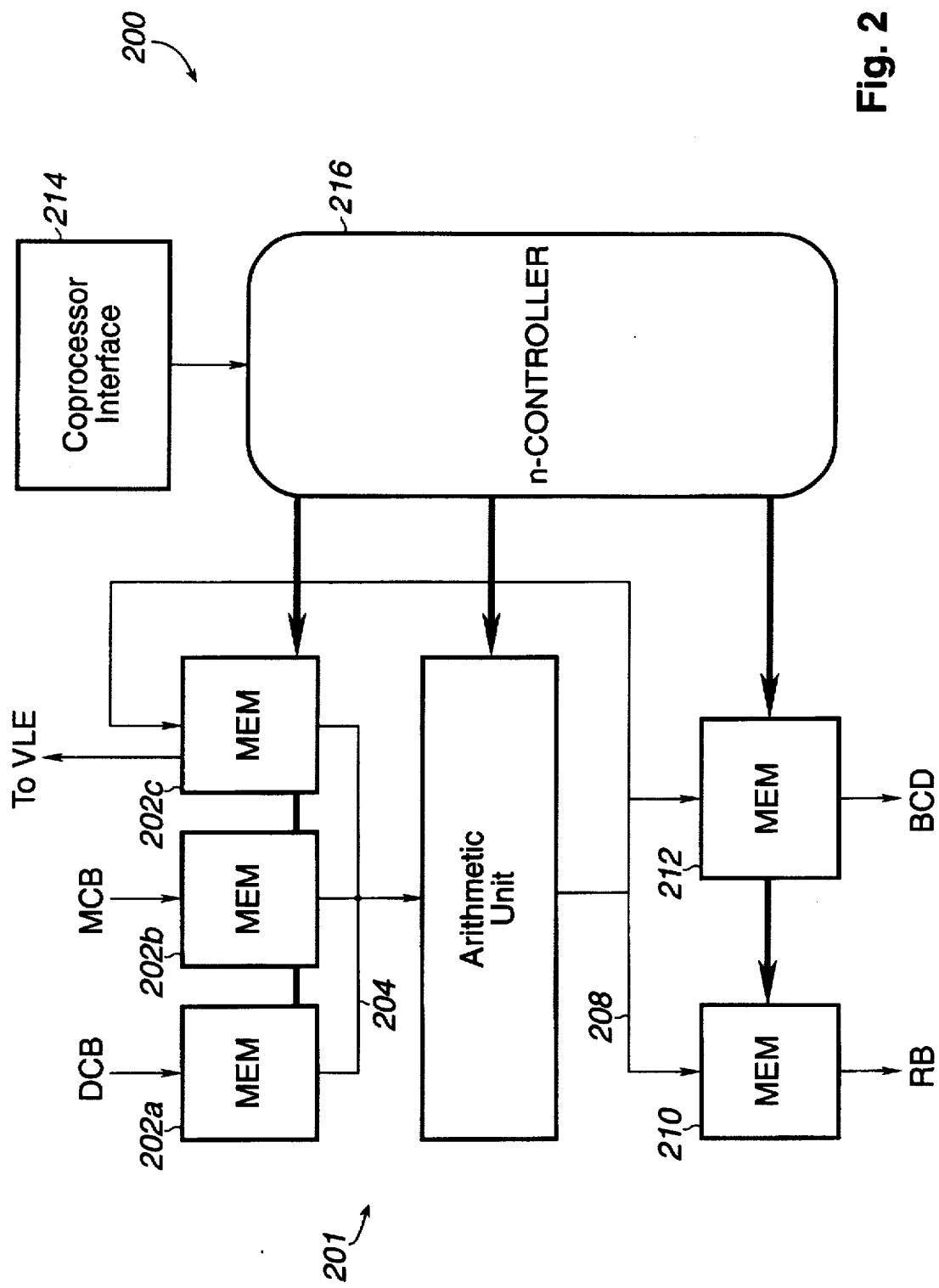
FIG. 2 is a simplified block diagram of an MPEG encoder system including a generalized data processing path according to the present invention.

Referring now to FIG. 2, a simplified block diagram is shown of a more specific MPEG encoder system 200 including a generalized data processing path 201 according to the present invention for performing many of the functions and operations of the exemplary MPEG video encoder system 100. A memory 202a receives differentially coded blocks (DCB) of data, a memory 202b receives motion compensated blocks (MCB) of data, and a memory 202c is provided for storing intermediate results and for providing final results of operations to a VLE, such as the VLE 110. Data from one or more of the memories 202a, 202b and 202c is provided through a selectable data bus 204 to an 8-slice arithmetic unit (AU) 206 for performing various operations and functions as further described below. Output data from the AU 206 is provided through another selectable data bus 208 to a memory 210 for providing reconstructed blocks (RB) of data, to a memory 212 for providing block coefficient data (BCD), and also back to the memory 202c for storing intermediate results.

A coprocessor register interface 214 receives commands, variables and other control information from a primary processor or coprocessor (not shown) for controlling and determining particular operations performed by the encoder system 200. A microcontroller (MC) 216 is coupled to the coprocessor register interface 214 for receiving the control commands and variables and for controlling and addressing the memories 202a, 202b, 202c, 210 and 212, the AU 206 as well as the selectable data buses 204 and 208. In general, the processor and MC 216 control data flow and the particular operation being performed. As described more fully below, the selectable data buses 204, 208 include select logic, such as multiplexers or the like, which are controlled by the MC 216 for purposes of controlling data flow through the generalized data processing path 201.

Figure 3:
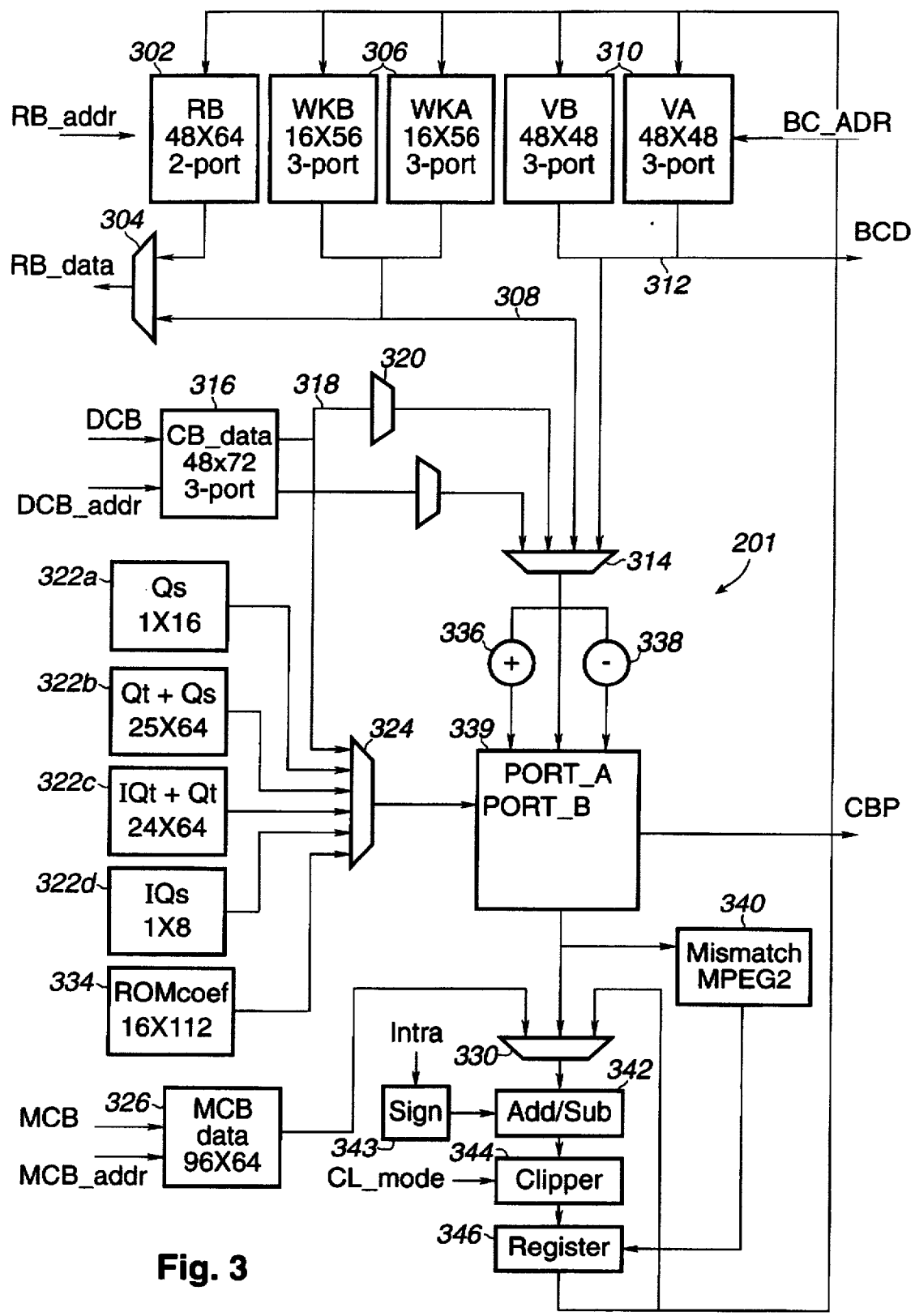
FIG. 3 is a more detailed block diagram illustrating the individual memories of the encoder system of FIG. 2.

Referring now to FIG. 3, a more detailed block diagram is shown of the encoder system 200 of FIG. 2, including the generalized data processing path 201 according to the present invention. An RB register 302 is preferably a 48×64 bit, 2-port, double-buffered memory device for storing a macroblock of output RB data, preferably according to a 4:2:0 spacing criterion. Each block includes 64 pixels, where the pixels may be selected by select logic or multiplexer (mux) 304 for providing RB output data on an RB bus. A working register 306 preferably includes two banks, WKA, WKB of 16×56, 3-port memory devices for performing ping-pong operations and for storing intermediate results from the AU 206. In the preferred embodiment, 14 bits of precision is desired for the intermediate results, so that a total of 112 bits are needed for each bank. Data from the working register 306 may be provided on a bus 308 and selected by the mux 304 for providing data through the RB data port to video RAM (VRAM) for special operations, such as add, subtract, multiply and multiply plus accumulation, etc. The bus 308 is also provided to an input of select logic 314 for selecting a memory register and providing data to a first input, referred to as PORT_A, of an 8-slice multiplier and accumulator (MAC) 339 of the AU 206.

A VLE register 310 preferably comprises two banks, VA and VB of 48×48, 3-port memory devices for storing forward processed data for variable length coding (VLC) within the VLE 110 and also for storing reverse processed data for reconstructing blocks. The RB outputs are preferably in raster scan order. Data from the VLE register 310 is provided on a selectable bus 312 for providing BCD, where the bus 312 is also provided to another input of the mux 314 for processing by the 8-slice MAC 339. A CB register 316 preferably comprises a 48×72, 3-port memory device for receiving differentially coded blocks (DCBs) and a DCB address for providing the DCBs for processing. A DCB is the difference block between a current block and a motion compensated block. The DCBs may be provided on a bus 318 and through a mux 320 to another input of the mux 314. The DCBs may be provided as coefficient data on the bus 318 through another mux 324, which is coupled to another input, referred to as PORT_B, of the 8-slice MAC 339.

An MCB register 326 is preferably a 96×64 size memory device for receiving motion compensated blocks (MCBs) fetched by the processor. Up to two macroblocks of MCBs may be stored in the MCB register 326 at a time, where each macroblock is processed in sequential order. MCBs from the MCB register 326 are provided to one input of a mux 330. Four quantization registers 332a, 332b, 332c and 332d store tables of scale (s) and matrix (t) values used during quantization (Q) and inverse quantization (IQ) operations. In the preferred embodiment, the quantization values are in the form of a 12-bit mantissa and 4-bit exponent, where a coefficient is multiplied by the mantissa and shifted by the exponent. The register 332a is preferably a 1×16 bit register for storing a Qs scale value, and the register 332b is preferably a 25×64 bit register for storing a table of Qt quantization values used during quantization operations. The register 332c is preferably a 24×64 bit register for storing a table of IQt inverse quantization values. The register 332d is preferably a 1×8 bit register for storing an IQs inverse quantization scalar value. A 16×112 bit read only memory (ROM) 334 is provided for storing matrices of constant value multiplicands for performing DCT and IDCT operations. The outputs of the registers 332a–d and the ROM 334 are provided to respective inputs of the mux 324, for selecting appropriate values to be provided to PORT_B of the 8-slice MAC 339.

An adder 336 and a subtractor 338 receive data from the output of the mux 314 for performing butterfly calculations for DCT, described further below, where the outputs of the adder 336 and the subtractor 338 are provided to PORT_A of the 8-slice MAC 339. The outputs of the 8-slice MAC 339 are collectively provided to another input of the mux 330 and to mismatch MPEG-2 logic 340. Mismatch control is generally performed after an inverse quantization operation to minimize the noise and errors introduced during a quantization operation. The output of the mux 330 is provided to one input of an adder/subtractor 342, which also receives a sign bit at another input from sign logic 343. The output of the adder/subtractor 342 is provided to clipper logic 344, which aligns data to the appropriate bus size depending upon the particular mode of operation. In an RB mode, the clipper logic 344 preferably performs clipping between 0 and 255 and in an IDCT mode, the clipper logic 344 performs clipping between −256 and 255. The output data from the clipper logic 344 is provided to a register 346, which provides the data to another input of the mux 330 and to the register memories 302, 306 and 310. The mismatch MPEG-2 logic 340 controls the register 346 to perform mismatch control functions according to MPEG-2.

Figure 4:
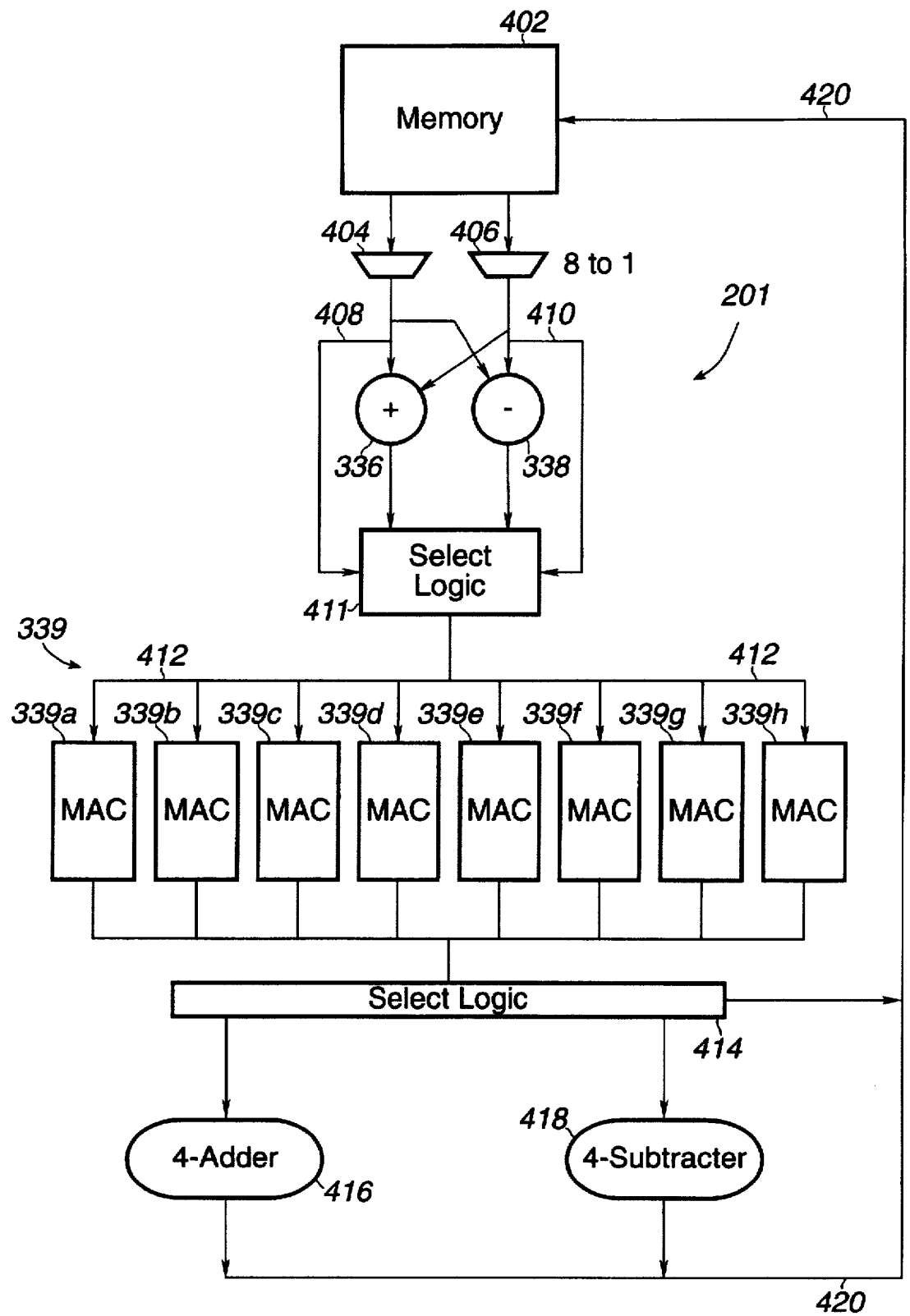
FIG. 4 is a block diagram showing more details of the generalized data path shown in FIG. 2.

Referring now to FIG. 4, a block diagram is shown of the generalized data processing path 201 according to the present invention. A memory 402 generally incorporates all of the register memories 302, 306, 310 and 316 for providing addressed and selected data values to the adder 336, the subtractor 338 and/or the 8-slice MAC 339. Two 8:1 muxes 404 and 406 are shown for more particularly showing the memory selecting function of the mux 314 of FIG. 3 for selecting data from one of the register memories. Selected data from the memory 402 is provided to both the adder 336 and the subtractor 338 for performing a butterfly calculation for DCT. Such butterfly calculations are not performed on the front end for IDCT operations, where the data bypasses the adder 336 and subtractor 338 on bus paths 408, 410, respectively. The buses 408, 410 and the outputs of the adder 336 and the subtractor 338 are provided to select logic 411, which provides selected data values at its output to the inputs of the 8-slice MAC 339. In particular, the processor and MC 216 controls the select logic to receive a summed value from the adder 336 and a difference value from the subtractor 338 during DCT operations. For non-DCT operations, including IDCT, quantization and inverse quantization, the adder 336 and the subtractor 338 are bypassed where the select logic selects the buses 408, 410.

The output of the select logic 411 is provided to a bus 412, which provides data values to each of eight separate and similar MACs 339a–h of the 8-slice MAC 339. The outputs of the MACs 339a–h are provided to select logic 414, which has a first output coupled to a feedback bus 420, which is further provided to the input of the memory 402. The select logic also has outputs coupled to the input of a 4-adder 416 and to the input of a 4-subtractor 418. The outputs of the 4-adder 416 and 4-subtractor 418 are coupled to the bus 420 for providing data values to the memory 402. The select logic 414 is controlled by the processor and MC 216 to provide data values from the MACs 339a–h to the 4-adder 416 and 4-subtractor 418 during IDCT operations, or to provide the data values directly to the bus 420 during DCT, quantization and inverse quantization operations. For IDCT operations, respective data bytes are provided to the 4-adder 416 and the 4-subtractor 418 for performing butterfly calculations prior to being provided back to the memory 402. The particular flow of data and the functions performed depends upon the particular operation being performed, as controlled by the processor and MC 216. As described more fully below, the generalized data processing path 201 performs the DCT, quantization, inverse quantization and IDCT operations all using the same MACs 339a–h.

Figure 5:
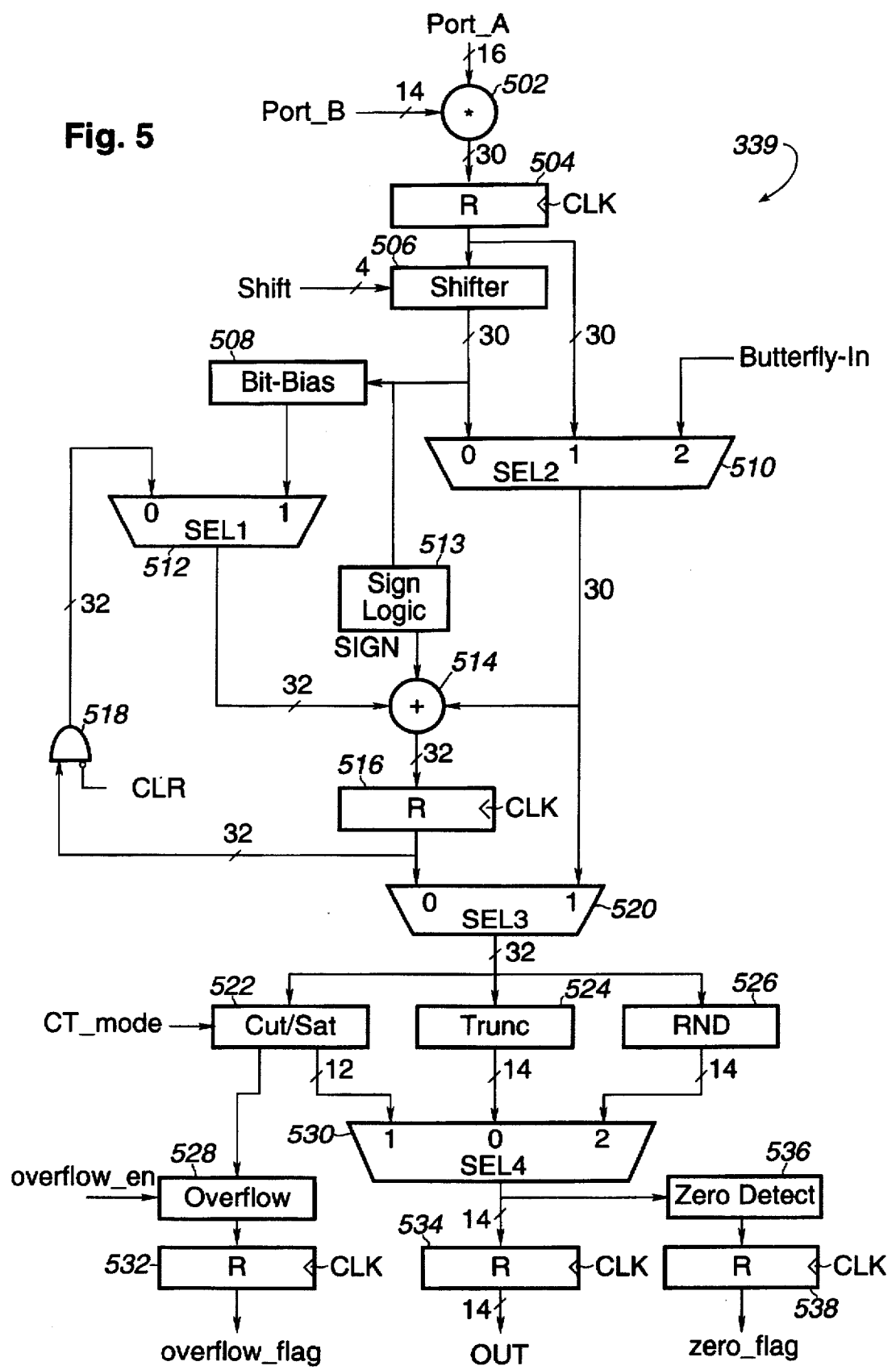
FIG. 5 is a more detailed schematic diagram of the MACs provided within the generalized data path shown in FIG. 4.

Referring now to FIG. 5, a more detailed schematic diagram is shown of each of the MACs 339a–h within the generalized data processing path 201. Data values from the two ports PORT_A and PORT_B are provided to respective inputs of a binary multiplier 502. PORT_A is preferably 16 bits and PORT_B is 14 bits for providing selected constants or coefficients from the mux 324. The 30-bit output of the multiplier 502 is provided to the input of a register 504, where each register described herein is preferably clocked by a common clock signal CLK for synchronizing data flow. The 30-bit output of the register 504 is provided to the input of a shifter 506, which receives a 4-bit signal SHIFT indicating the number of binary shifts to be performed by the shifter 506. The shifter 506 performs simple binary multiplication by 2, 4, 8, 16, 32, etc. Sign logic 513 is coupled to the shifter 506 for determining the sign of the value in the shifter 506 and for providing a corresponding signal SIGN.

The 30-bit output of the shifter 506 is provided to the input of bit-bias logic 508 and to the logic zero input of a three-input mux 510. The mux 510 receives the output of the register 504 at its logic one input and a BUTTERFLY calculation input value at its logic 2 input. The 30-bit output of the mux 510 is provided to a first input of a three-input adder/subtractor 514 and to the logic one input of a two-input mux 520. The adder/subtractor 514 adds or subtracts the output of the mux 510 provided to the first input with the SIGN signal provided to a second input and with a 32-bit output value of a two-input mux 512 provided to a third input of the adder/subtractor 514. The 32-bit output of the adder/subtractor 514 is provided to the input of a register 516, which provides its output to the logic zero input of the mux 520. The 32-bit output of the register 516 is also provided on a bit-by-bit basis to one input each of 32, two-input AND gates 518, where each of the AND gates 518 receives a signal CLR at an inverted input. The 32 output bits of the AND gates 518 are collectively provided to the logic zero input of the mux 512, which receives the output of the bit-bias logic 508 at its logic one input.

The 32-bit output of the mux 520 is provided to the input of cutter/saturation logic 522, to the input of truncation logic 524 and to the input of rounding logic 526. The cutter/saturation logic 522 preferably performs any one of three different operations, including saturation, cutter for MPEG-1 and cutter for MPEG-2, based on a mode value CT_mode. Saturation is the function of cutting from −2048 to 2047, the cutter for MPEG-1 is the function of cutting from −255 to 255, and the cutter for MPEG-2 is the function of cutting from −2047 to 2047. The 12-bit output of the cutter/saturation logic 522 is provided to the logic one input of a three-input mux 530. The truncation logic 524 truncates its output to 14 bits to reduce the size of the external output bus of the MACs 339, where the output of the truncation logic 524 is provided to the logic zero input of the mux 530. The rounding logic 526 performs a rounding function of the output of the mux 520 to a 14-bit output value, which is provided to the logic two input of the mux 530.

The cutter/saturation logic 522 also provides an output to overflow logic 528 for detecting overflow of the cutter/saturation logic output if enabled by a signal OVERFLOW_EN. The output of the overflow logic 528 is provided to the input of a register 532, which asserts an OVERFLOW_FLAG. The 14-bit output of the mux 530 is provided to the input of a 14-bit output register 534 and to the input of zero-detect logic 536. The output of the register 534 asserts a 14-bit output value referred to as OUT onto a portion of the bus 414. The output of the zero-detect logic 536 is provided to the input of a register 538, which asserts a ZERO_FLAG indicative of whether the OUT value is zero.

Specific operation of each of the functional aspects of the MACs 339a–h will not be described. It is understood, however, the MACs 339a–h are fully capable of performing the multiply and accumulation functions necessary by DCT and IDCT operations, as well as the necessary functions and operations for performing quantization and inverse quantization, which calculations are partially shown in FIGS. 8 and 9.

In general, the generalized data processing path 201 performs a DCT operation, then a quantization operation, and the result may be provided to the VLE register 310 of the memory 402 to the VLE 110 for purposes of variable length encoding. The result also remains in the working registers 306 of the memory 402, where the generalized data processing path 201 performs inverse quantization and then IDCT for providing reconstructed blocks to the RB register 302. It is appreciated therefore that a substantial portion of the calculations necessary for transformation and reconstruction are performed by the same data path, namely the generalized data processing path 201.

Although not specifically shown, it is understood that the processor executes software for controlling the entire encoding process to perform video functions. The processor generally sends commands and variables to control the MC 216, which in turn controls the select logic 324, 404, 406, 411, 414, the MACs 339a–h and the internal muxes therein, including the muxes 510, 512, 520, 530, and the memories 302, 306, 310, 316, 332, 334, 326, 402, as well as other logic of the generalized data processing path 201. The various memories are controlled by loading them with the appropriate parameters and data values in the case of programmable or dynamic memories, and by providing addresses and enable signals to all memories to access the desired data values and parameters at the appropriate time to achieve the desired calculations. The various select logic devices are preferably implemented with one or more multiplexers or the like for selection of data and for controlling data flow to achieve the desired calculations and operations.

Figures 6A, 6B:
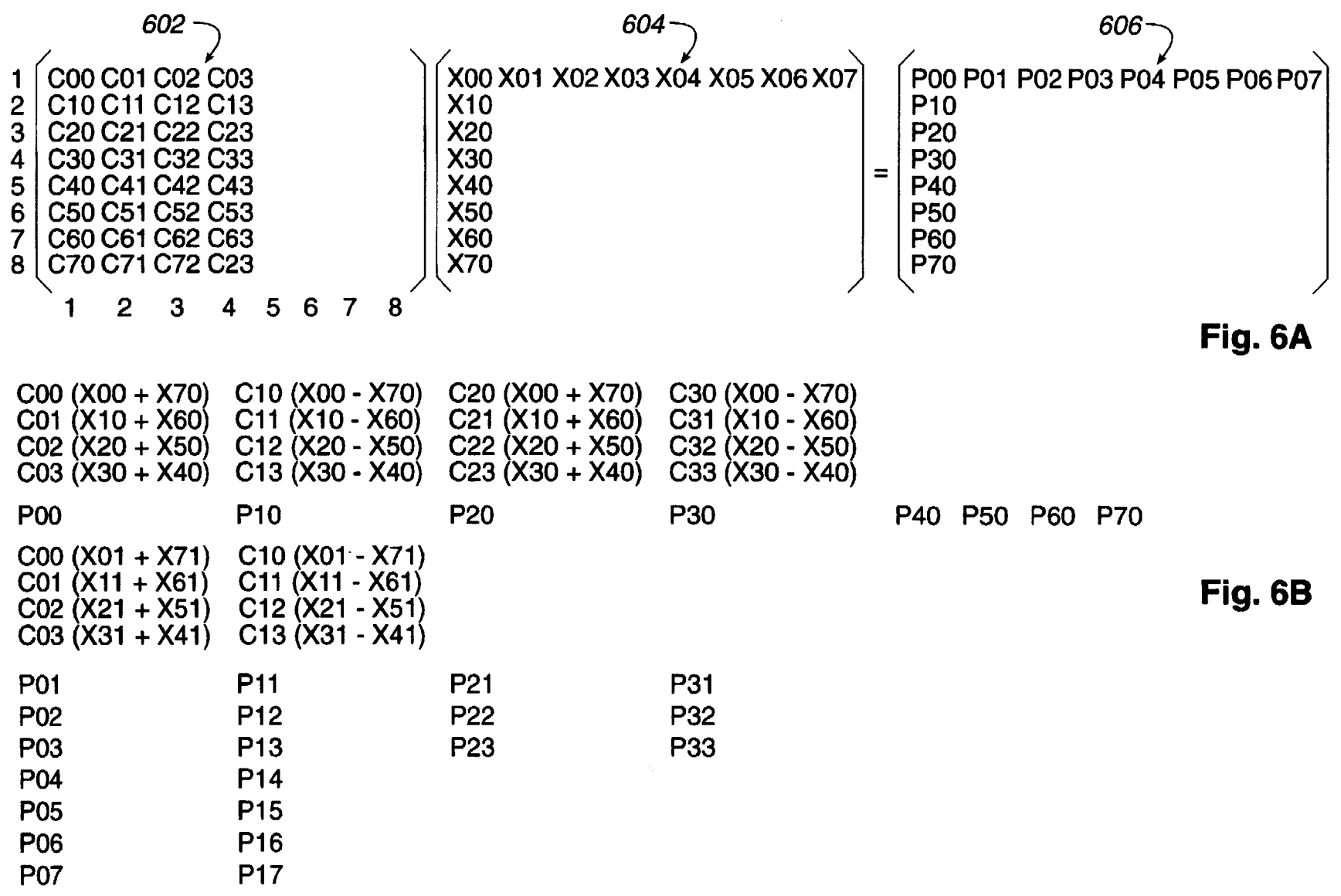

FIGS. 6A and 6B are diagrams illustrating some of the calculations performed for a DCT operation. The DCT operation illustrated is for performing the following equation (1):

$$X = Cx(C)_t = (C(Cx)_t)_t \quad (1)$$

where "X" is the resulting block or matrix of DCT coefficients, "C" is a matrix of constant value multiplicands 602, "x" is the input block or matrix of pixel values 604, and "t" represents the matrix transform operation where rows and columns are swapped to flip the resultant matrix along its diagonal. In FIG. 6A, the matrix of constant values 602 comprises an 8×8 matrix of constants Cij, for i=0–7, and j=0–7. The first row only shows the values C00–C03, since the values C04–C07 mirror the C00–C03 values, i.e., C00=C07, C01=C06, C02=C05 and C03=C04. This is true for all odd rows beginning with C00, C20, C40 and C60. A similar redundancy exists for all of the even rows beginning with C10, C30, C50 and C70, except that the signs are opposite, i.e., C10=−C17, C11=−C16, C12=−C15 and C13=−C14. Therefore, only the first four values of each of the rows of the matrix of constant values need be stored to save memory.

The matrix of pixel values 604 includes pixel values xij for i=0–7, and j=0–7. The matrix 606 of P values Pij for i=0–7, and j=0–7 results after multiplying matrix 602 by 604, or Cx. According to FIGS. 6A and 6B and equation (1) above, the P matrix 606 is transposed, resulting in a matrix Pji, which is then multiplied by the C matrix 602. The result is transposed again to achieve the resultant X matrix. FIG. 6B illustrates the first part of the calculations resulting in the transposed P matrix, or Pji, otherwise referred to as the transposed matrix $P_t$. The intermediate term P00 is calculated using the following equation (2):

$$P00 = C00*x00 + C01*x10 + C02*x20 + C03*x30 + C04*x40 + C05*x50 + C06*x60 + C07*x70 \quad (2)$$

where an asterisk "*" denotes multiplication. Since C00=C07, C01=C06, etc., equation (2) is simplified as shown by the following equation (3):

$$P00 = C00(x00+x70) + C01(x10+x60) + C02(x20+x50) + C03(x30+x4) \quad (3)$$

A similar simplification is available for the calculation of the intermediate term P10 as shown by the following equation (4):

$$P10=C10(x00-x70)+C11(x10-x60)+C12(x20-x50)+C13(x30-x4)(4)$$

The remaining intermediate terms are determined in a similar manner.

As illustrated in FIG. 6B, transposition is easily achieved by reordering the calculations performed, or storing the results in the appropriate location within the memory 402 for an automatic transposition of the matrix. For example, the intermediate terms P10, P20, P30, etc. are calculated and stored in the P01, P02, P03, etc. locations, respectively, and transposition of the P matrix 606, resulting in the $P_t$ matrix, is achieved without further processing. Such automatic transposition is easily achieved by the generalized data processing path 201 by appropriate control of the select logic 414 and the memory 402 by the MC 216.

With reference to the Figures, the operation of DCT is easily described. The C matrix 602 (or a representative portion thereof) is stored in the ROM 334 and the appropriate elements thereof are provided to the appropriate MACs of the 8-slice MAC 339 at the appropriate times through the mux 324, as controlled by the MC 216. The pixel values x00 and x70 are first provided to both the adder 336 and the subtractor 338 for calculating the values x00+x70 and x00-x70, respectively. The adder 336 and the subtractor 338 therefore perform preliminary butterfly calculations for the DCT prior to multiplication in the 8-slice MAC 339. The summed value x00+x70 is then provided to the MACs 339a, 339c, 339e and 339g, while the difference value x00-x70 is provided to the MACs 339b, 339d, 339f and 339h as controlled by the select logic 411. Meanwhile, the constant values C00, C10, C20, C30, C30, C20, C10 and C00 are provided from the ROM 334 to the MACs 339a-h, respectively, and multiplied therein by the respective summed and difference values. This completes calculation for the first row shown in FIG. 6B.

The next step is performed in a similar manner, where the pixel values x10 and x60 are provided to the adder 336 and the subtractor 338 for calculation of the summed value x10+x60 and the difference value x10-x60. Again, the summed value is provided to the MACs 339a, 339c, 339e, 339g while the difference value is provided to the MACs 339b, 339d, 339f, 339h. The constant values C01, C11, C21, C31, C31, C21, C11 and C01 are then provided to the MACs 339a-h and multiplied the by respective sum or difference values according to the second row shown in FIG. 6B. The respective results are then added to, or otherwise accumulated with, the results from the first row in each of the MACs 339a-h. Such accumulation preferably occurs within the accumulation register 516 using the feedback mux 512. Operation continues in a similar manner, where all of the terms are multiplied and accumulated for calculating the intermediate terms P00-P70 within the MACs 339a-h, respectively. These intermediate terms are provided across the bus 420 and stored into the working memory 306 of memory 402 at locations corresponding to P00-P07 to complete the transposition. The remaining intermediate terms P01-P71, P02-P72, P03-P73, etc. are then calculated and stored back into the working memory 306 in a similar manner at the desired transposed locations.

This completes the calculation of the $P_t$ matrix representing the intermediate term (Cx), from equation (1). In the preferred embodiment, the DCT operation is performed in two dimensional operations, where the $P_t$ matrix represents completion of the first dimensional operation. The second dimensional operation is very similar for completion of the X matrix of DCT coefficients of equation (1).

Although not shown, the same procedure is followed for multiplying the constant C matrix 602 by the transposed $P_t$ matrix. In particular, the terms $P_t00$ and $P_t70$ are provided to both the adder 336 and the subtractor 338 for calculating the summed and difference values $P_t00+P_t70$ and $P_t00-P_t70$, respectively. The adder 336 and the subtractor 338 again perform preliminary butterfly calculations for the DCT prior to multiplication in the 8-slice MAC 339. The summed value $P_t00+P_t70$ is then provided to the MACs 339a, 339c, 339e and 339g, while the difference value $P_t00-P_t70$ is provided to the MACs 339b, 339d, 339f and 339h. Meanwhile, the constant values C00, C10, C20, C30, C30, C20, C10 and C00 are again provided from the ROM 334 to the MACs 339a-h, respectively, and multiplied therein by the respective summed and difference values. The procedure is repeated and the results accumulated for calculating the final DCT coefficients X00-X07, respectively. These coefficients are provided across the bus 420 and stored into both the VLE memory 310 of memory 402 at the appropriate locations to complete the final transposition to achieve the X matrix of DCT coefficients.

Figures 7A, 7B:
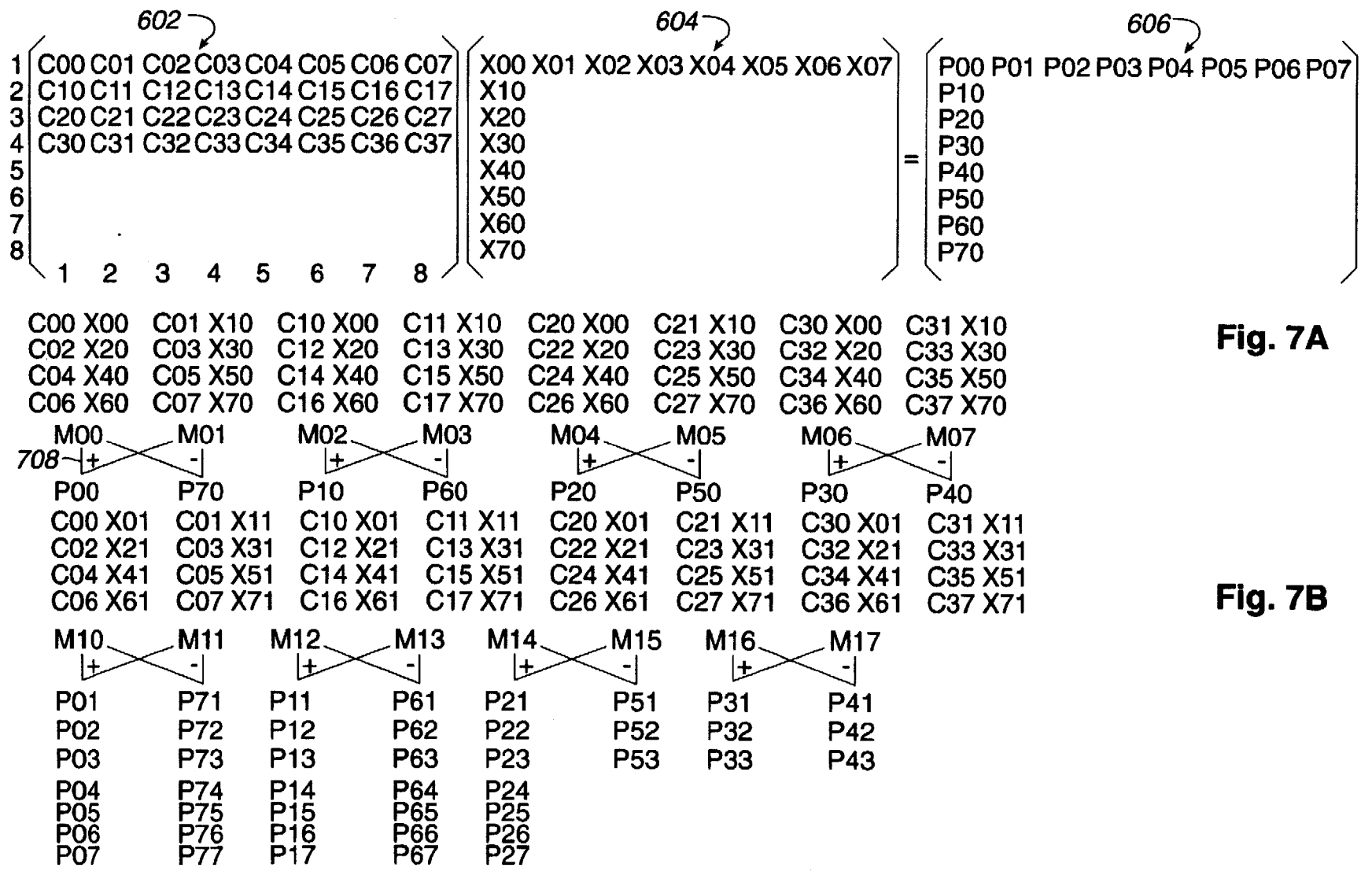

The next operation is quantization, followed by inverse quantization, which is then followed by inverse DCT or IDCT. However, the next operation that will be described is the IDCT operation as illustrated in FIGS. 7A and 7B, where the quantization and inverse quantization operations will be described later with reference to FIGS. 8 and 9. A constant matrix C 702 is shown, which has an inverse relationship with the C matrix 602, but where the values are mirrored along a line between the fourth and fifth rows rather than the fourth and fifth columns. Thus, C00=C70, C01=C60, C02=C50 and C03=C04, and C01=-C71, C11=-C61, C21=-C51 and C31=-C41, etc. DCT coefficients are stored in the working memory 306 as an X matrix 704, and the resulting multiplication of the C and X matrices 702, 704 is an intermediate matrix P 706. The P matrix 706 is automatically transposed to form the $P_t$ matrix as described previously. The IDCT operation illustrated in FIGS. 7A and 7B is for performing the following equation (5):

$$x=CX(C)_t=(C(CX)_t)_t \quad (5)$$

where "X" is the input matrix 702 of DCT coefficients, "C" is the C matrix 702, "x" is the output block or matrix of pixel values, and "t" represents the matrix transposition operation.

The first intermediate term P00 of the P matrix 706 is calculated according to the following equation (6):

$$\begin{aligned} P00 &= C00*X00 + C01*X10 + C02*X20 + C03*X30 + \\ &\quad C04*X40 + C05*X50 + C06*X60 + C07*X70 \\ &= (C00*X00 + C02*X20 + C04*X40 + C06*X60) + \\ &\quad (C01*X10 + C03*X30 + C05*X50 + C07*X70) \\ &= M00 + M01 \end{aligned} \quad (6)$$

where M00 and M01 are also referred to a intermediate terms. Also, the intermediate term P70 of the P matrix 706 is calculated according to the following equation (7) given the relations provided above for a mirrored matrix:

$$\begin{aligned} P70 &= C00*X00 - C01*X10 + C02*X20 - C03*X30 + \\ &\quad C04*X40 + C05*X50 + C06*X60 - C07*X70 \\ &= (C00*X00 + C02*X20 + C04*X40 + C06*X60) - \\ &\quad (C01*X10 + C03*X30 + C05*X50 + C07*X70) \\ &= M00 - M01 \end{aligned} \quad (7)$$

FIG. 7B illustrates the appropriate values that are provided for multiplication and accumulation in the MAC 339a for calculation of the intermediate term M00, while the intermediate term M01 is calculated by the MAC 339b. In a similar manner, intermediate terms M02, M03, M04, M05, M06 and M07 are calculated by the MACs 339c–h, respectively.

Since a preliminary butterfly calculation is not necessary for the IDCT calculations, the adder 336 and the subtractor 338 are bypassed by the select logic 411 using the buses 408, 410. In particular, the coefficient X00 is first provided to the MACs 339a, 339c, 339e and 339g, while the coefficient X10 is provided to the MACs 339b, 339d, 339f and 339h. Meanwhile, the constant values C00, C01, C10, C11, C20, C21, C30 and C31 are provided to the MACs 339a–h, respectively, and the provided values are multiplied within the respective MACs. Then, the coefficient X20 is provided to the MACs 339a, 339c, 339e and 339g, while the coefficient X30 is provided to the MACs 339b, 339d, 339f and 339h. Meanwhile, the constant values C02, C03, C12, C13, C22, C23, C32 and C33 are provided to the MACs 339a–h, respectively, and the provided values are multiplied by the coefficients, and the results are accumulated with the previous calculation. This process is continued until the intermediate terms M00–M07 are calculated by the MACs 339a–h, respectively.

After the intermediate terms M00–M07 are calculated by the MACs, 339a–h, the 4-adder 416 is used to calculate the intermediate terms P00=(M00+M01), P10=(M02+M03), P20=(M04+M05), and P30=(M06+M07). Meanwhile, the 4-subtractor 418 is used to calculate the intermediate terms P70=(M00–M01), P60=(M02–M03), P50=(M04–M05), and P40=(M06–M07). A butterfly symbol 708 in FIG. 7B illustrates this butterfly calculation, which is performed after the multiply and accumulation operations performed by the MACs 339a–h. The particular order of the values provided to the 4-adder 416 and the 4-subtractor 418 is not necessarily the order shown in FIG. 7B, but the calculations may be organized so that the resulting intermediate terms P00–P70 are stored back into the working memory 306 in the desired order to complete the transposition operation. For example, the order of the 4-adder 416 is preferably the same for calculating the intermediate terms P00, P10, P20 and P30, whereas the order of the 4-subtractor 418 is reversed by the select logic 414 for calculating the intermediate terms P40, P50, P60 and P70 in the desired transpositional order.

The remaining values of the intermediate P matrix 706 are calculated in a similar manner, and stored in transpositional order resulting in the transposed $P_t$ matrix stored in the working memory 306. This completes the first dimensional operation for IDCT. The $P_t$ matrix is then multiplied by the C matrix 702 in a similar manner as described above, where the results are again transposed and stored as an x matrix of pixel values to complete the second dimensional operation of IDCT. The resulting x matrix of pixel values represents a reconstructed macroblock, which may then be stored into the RB register 302 of the memory 402.

In the preferred embodiment, the select logic and the 4-adder 416 and 4-subtractor 418 are not necessary but are distributed among and incorporated within the MACs 339a–h. In particular and as shown in FIG. 5, the mux 510 of each MAC receives a butterfly input from a complementary MAC, and the adder/subtractor 514 performs either addition or subtraction to complete a portion of the butterfly calculation. The complementary MACs therefore swap values and calculate the summed and difference values to complete the butterfly calculation. As described above, the MACs 339a–h could compute the intermediate values M00–M07, respectively, where the complementary pairs would then be 339a/b, 339c/d, 339e/f, and 339g/h. However, as shown in FIG. 7B, the MACs 339a–h would have to calculate the intermediate terms P00, P70, P10, P60, P20, P50, P30 and P40, respectively, so that the MC 216 would need to address the memory 402 in the appropriate manner to store the results in the desired transposed format.

Alternatively, the complementary pairs are chosen as 339a/h, 339b/g, 339c/f and 339d/e, where the first MAC of each pair calculates the summed value and the second calculates the difference value. This results in the MACs 339a–h calculating the intermediate values P00, P10, P20, P30, P40, P50, P60 and P70, respectively. The results are stored in a straightforward manner in the memory 402.

It is now appreciated that the generalized data processing path 201 is used for calculating both the DCT and IDCT operations using the same MACs 339a–h. Such combination of these transform operations into a single data path reduces the overall complexity of a video motion compensation system. Redundant components, such as another array of MACs, are eliminated and memory devices are used more efficiently.

Figure 8:
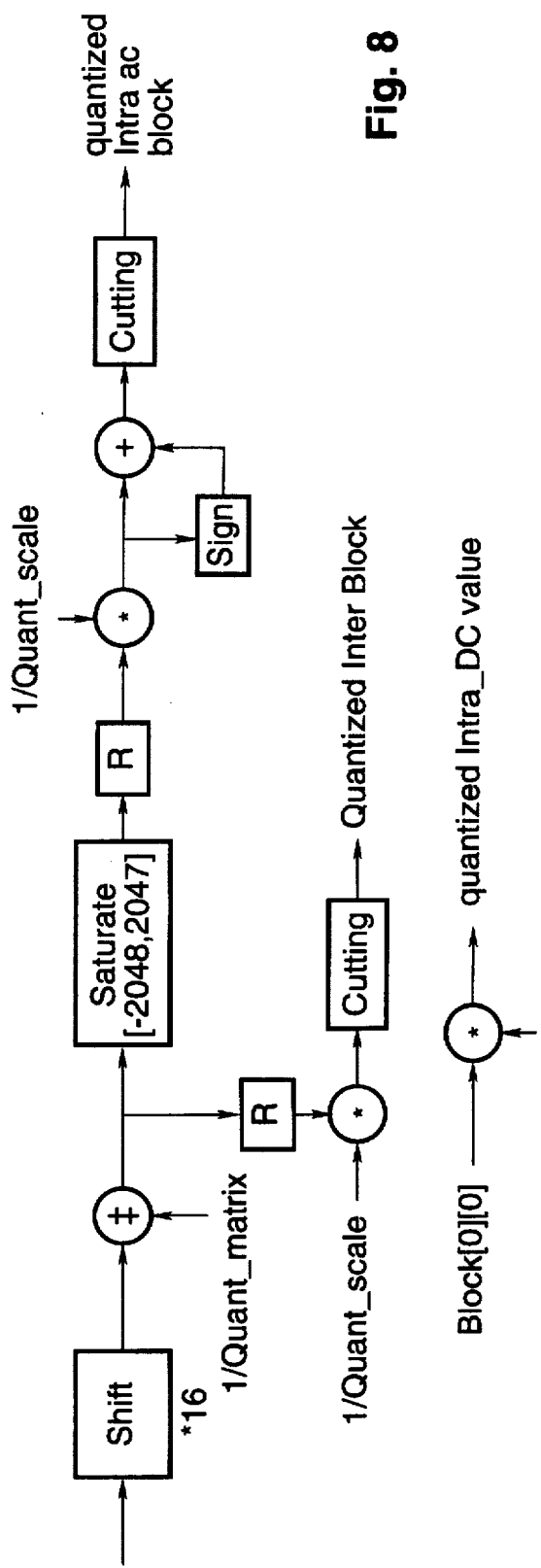
FIG. 8 is a data flow diagram illustrating the calculations performed for a quantization operation.

Referring now to FIG. 8, a data flow diagram is shown illustrating the calculations performed for a quantization operation. In the preferred embodiment, the quantization operation performed is an approximation according to the test model (TM) editing committee of MPEG, including the TM4 and TM5 specifications. The TM4 and TM5 quantization for the intrafield mode for the AC DCT coefficient values is provided in the following equations (8) and (9):

$$ac'_{ij}=16*ac_{ij}/Qt_{ij} \qquad (8)$$

$$QAC_{ij}=[ac'_{ij}+sign(ac'_{ij})*(p*Qs//q)]/(2*Qs) \qquad (9)$$

where "ac" represents each AC term from the DCT blocks after the DCT operation, the sign function is 1 if the parenthetical value is positive, −1 if the value is negative, and 0 if the value is zero, $Qt_{ij}$ is the corresponding entry from the Qt quantization matrix table, the value Qs defines the quantization scaling factor, p and q are empirical modification values determined during run-time and the division symbol "//" represents integer division. Although it is recommended that p//q=¾ for some embodiments, it is preferred to set p//q=1 to simplify the hardware implementation. For the DC term for intrafield mode, the DC term of the block, or [0,0], is multiplied by ⅛, ¼, ½ or 1 depending upon a desired and user determinable precision value, referred to as INTRA_DC_PRECISION. For the intrafield mode, the following equation (10) applies:

$$QAC_{ij}=[ac'_{ij}+(p*Qs//q)]/(2*Qs) \qquad (10)$$

which equation is similar to equation (9) without the sign () function.

FIG. 8 is a data flow diagram illustrating the calculation of approximations of the TM4 and TM5 equations provided above within the MACs 339 shown in FIG. 5 in the generalized data processing path 201. The Qs scaling factor value is programmable within the quantization register 332a and the Qt quantization matrix terms are stored in the quantization register 332b, where these values are provided to the respective MACs 339a–h at the appropriate times to perform the desired calculations.

Figure 9:
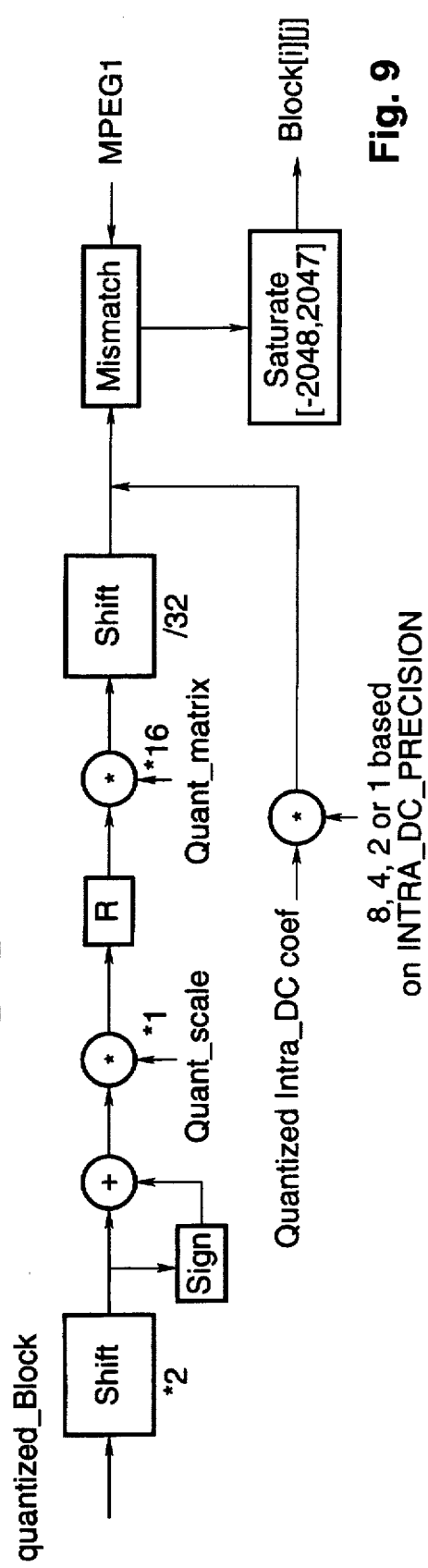
FIG. 9 is a data flow diagram illustrating the calculations performed for an inverse quantization operation.

Referring now to FIG. 9, a data flow diagram is shown illustrating the calculations performed for an inverse quantization operation. The inverse quantization is performed according to the recommendations of the MPEG committee draft as illustrated in the following equation (11):

$$F'_{uv}=[(2QF_{uv}+sign(QF_{uv}))*IQt_{uv}*IQs]/32 \quad (11)$$

where F represents the matrices from the quantization process, F' is the resulting matrix after inverse quantization, u, v are the respective coordinates with each block of values, the $IQt_{uv}$ are from the inverse quantization register 332c and the IQs scaling factor value is from the quantization register 332d. The sign () function applies only for non-intra or interfield mode and is zero for the intrafield mode. The intrafield DC coefficient is multiplied by 1, 2, 4 or 8 depending upon the multiplication factor applied to the DC value in the quantization operation. Again, the values are provided from the quantization registers 332 to the respective MACs 339a-h at the appropriate times for performing the calculations.

As shown in FIG. 9, mismatch control for MPEG-1 is performed within each of the MACs 339a-h, whereas mismatch control for MPEG-2 is performed in a separate logic block 340, as shown in FIG. 3. Thus, mismatch control is different for each case. As described previously, mismatch control is performed after the inverse quantization operation to minimize quantization errors introduced during the quantization process.

It is now appreciated that a generalized data processing path according to the present invention performs quantization and inverse quantization operations as well as the DCT and IDCT operations for a video encoder system. Memory devices are utilized more efficiently and duplicate devices, such as multiplier and accumulator units are combined into a single path, thereby resulting in a more efficient and streamlined data path.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A generalized data path for performing calculations for an encoder system, comprising:

a memory for storing data values, an adder and subtractor coupled to said memory for performing preliminary butterfly calculations;

first select logic for selecting data values between said memory and said adder and subtractor;

a plurality of multiplier and accumulator units (MACs) coupled to said first select logic for performing arithmatic and accumulation functions on data values selected by said first select logic, wherein each of said plurality of MACS includes:
a binary multiplier;
a shifter coupled to said multiplier;
an adder/subtractor coupled to said shifter;
feedback select logic coupled to said adder/subtractor; and
an accumulation register coupled to said adder/subtractor and said feedback select logic;
wherein said feedback select logic is configurable to output the value in said accumulation register to said adder/subtractor;

a plurality of adders and subtractors coupled to said memory for performing butterfly calculations on data values from said plurality of MACs;

second select logic coupled to said plurality of MACs and said memory for providing data values to said memory and said plurality of adders and subtractors; and control logic coupled to said memory, said first and second select logic and to said plurality of MACs for controlling data flow and for determining the type of operation performed.

2. The generalized data path of claim 1, wherein said memory includes:

a programmable working memory for receiving input blocks of data values and for storing intermediate blocks of data values.

3. The generalized data path of claim 1, wherein said memory includes:

a programmable memory for storing quantization tables and scale values for performing quantization operations.

4. The generalized data path of claim 1, wherein said memory includes:

a memory for storing constants for use in discrete cosine transform (DCT) and inverse DCT (IDCT) operations.

5. The generalized data path of claim 1, wherein said first select logic provides a summed value from said adder to selected ones of said plurality of MACs and provides a difference value from said subtractor to remaining ones of said plurality of MACs during DCT operations.

6. The generalized data path of claim 5, wherein said first select logic bypasses said adder and subtractor during IDCT, quantization and inverse quantization operations.

7. The generalized data path of claim 1, wherein said plurality of adders and subtractors comprise:

a four pixel adder; and a four pixel subtractor;

wherein said second select logic directs data values from selected ones of said plurality of MACs to said four pixel adder and directs data values from remaining ones of said plurality of MACs to said four pixel subtractor for performing butterfly calculations during IDCT operations.

8. The generalized data path of claim 1, wherein said second select logic and said plurality of adders and subtractors are distributed among and incorporated within said plurality of MACs, and wherein each of said plurality of MACs comprises:

a multiplexer receiving a butterfly input from another one of said plurality of MACs; and an adder/subtractor coupled to said multiplexer for performing a partial butterfly calculation during an IDCT operation.

9. The generalized data path of claim 1, further comprising:

a coprocessor coupled to said control logic.

10. The generalized data path of claim 1, further comprising:

said memory including a first memory for receiving input blocks of data values and for storing intermediate and final data values of an operation, and a second memory for storing matrices of constant multiplicand values; and said multiplier having two inputs including a first input for receiving data values from said first select logic and a second input for receiving said constant multiplicand values from said second memory.

11. The generalized data path of claim 1, further comprising:

sign logic for providing a sign signal indicative of the sign of data values in said shifter, wherein said sign signal is provided to said adder/subtractor.

12. The generalized data path of claim 1, further comprising:

MPEG mismatch logic coupled to said plurality of MACs.

13. The generalized data path of claim 1, wherein said control logic includes a microcontroller.

14. The generalized data path of claim 1, wherein said plurality of MACs comprises an eight-slice MAC for performing calculations on eight data values in parallel.

15. The generalized data path of claim 1, further comprising:

said memory including a reconstructed block memory, a working memory and an encoder memory; and third select logic for selecting between said reconstructed block, said working and said encoder memory and for providing selected data values to said adder and subtractor and said first select logic.

16. The generalized data path of claim 1, wherein said control logic controls said memory to transpose matrices of data values while being stored.

17. A generalized data path for a video encoder system, comprising:

a memory;

an adder coupled to said memory;

an subtractor coupled to said memory;

a plurality of multiplier and accumulator units (MACs) for performing arithmatic and accumulation functions, each one of said plurality of MACs including:

a binary multiplier;

a shifter coupled to said multiplier;

a multiplexer coupled to said shifter for receiving data values from a complementary one of said plurality of MACs for a butterfly calculation; and an adder/subtractor coupled to said multiplexer for performing half of said butterfly calculation, wherein said complementary MAC performs the other half of said butterfly calculation, wherein said adder/subtractor is further coupled to said shifter;

feedback select logic coupled to said adder/subtractor; and an accumulation register coupled to said adder/subtractor and said feedback select logic;

wherein said feedback select logic is configurable to output the value in said accumulation register to said adder/subtractor;

select logic for selecting data values form said memory or from said adder and said subtractor for proving said selected data values to corresponding inputs of said plurality of MACs; and control logic coupled to said memory, said select logic and to each of said plurality of MACs for controlling data flow and for determining the type of operation performed.

18. The generalized data processing path of claim 17, wherein said memory includes a programmable working memory for storing blocks of input and intermediate data values.

19. The generalized data processing path of claim 17, wherein said memory stores quantization scalar and table values for quantization and inverse quantization operations, and stores tables of constants for discrete cosine transform (DCT) and inverse DCT (IDCT) operations.

20. The generalized data processing path of claim 17, wherein said control logic controls the data processing path for performing DCT, quantization, inverse quantization and IDCT operations on blocks of data values received by said memory.

21. The generalized data processing path of claim 20, wherein said control logic controls the data processing path during said DCT and IDCT operations in two sequential dimensional calculations, wherein intermediate data values from a first dimensional operation is provided to the data processing path to perform a second dimensional operation.

22. The generalized data processing path of claim 17, wherein said control logic controls said memory for transposing matrices of data values while being stored.

23. The generalized data processing path of claim 17, further comprising:

said memory including a reconstructed block memory, a working memory and an encoder memory; and second select logic for selecting between said reconstructed block, said working and said encoder memory and for providing selected data values to said adder and said subtractor and said select logic.

24. The generalized data processing path of claim 23, further comprising:

said memory including a quantization memory for storing quantization and inverse quantization matrix and scale values and a DCT memory for storing DCT and IDCT constants; and third select logic for selecting between said quantization and DCT memories and for providing selected multiplicands to said plurality of MACs.

\* \* \* \* \*